(No Model.)
W. A. SAYERS.
VEHICLE RUNNING GEAR.
No. 532,342. Patented Jan. 8, 1895.
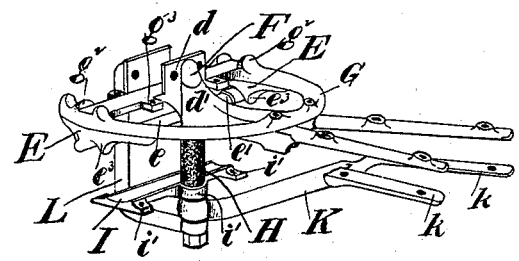
FIG.1.
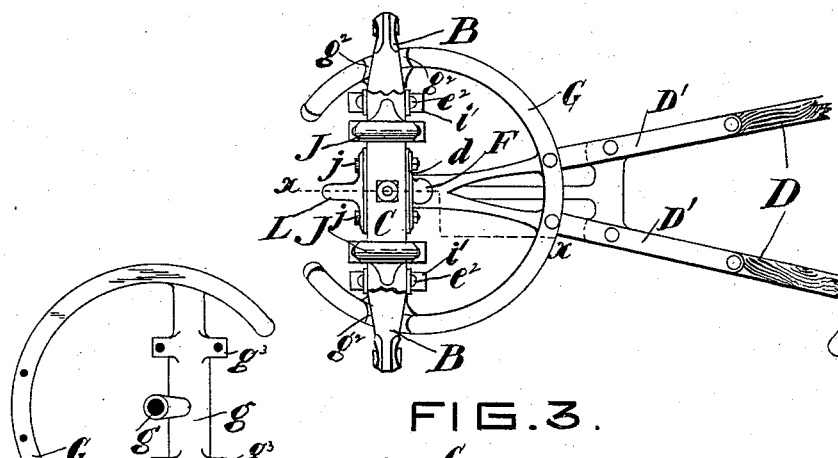
FIG.2.
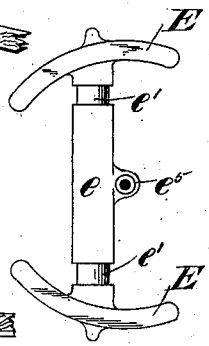
FIG.5.
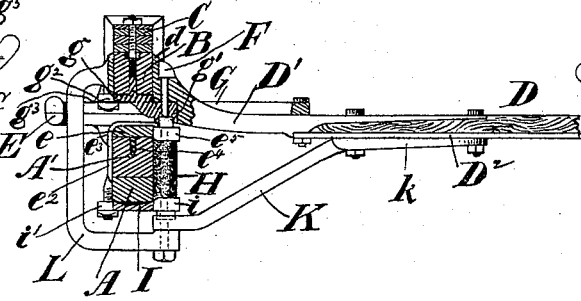
FIG.3.
FIG.4.
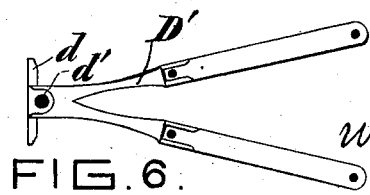
FIG.6.
Witnesses
Frank Davis
Emma Lyford
Inventor
William A. Sayers
By Geo. J. Murray
Atty

UNITED STATES PATENT OFFICE.

WILLIAM A. SAYERS, OF GLENDALE, OHIO.

VEHICLE RUNNING-GEAR.

SPECIFICATION forming part of Letters Patent No. 532,342, dated January 8, 1895.

Application filed July 5, 1894. Serial No. 516,541. (No model.)

*To all whom it may concern:*

Be it known that I, WILLIAM A. SAYERS, a citizen of the United States, and a resident of Glendale, in the county of Hamilton and State of Ohio, have invented certain new and useful Improvements in Vehicle Running-Gear, of which the following is a specification.

My invention relates to vehicle running gears and especially to the front gear irons for buggies, including the fifth wheel device, means for coupling the axle, bolster, spring and reach irons. Its object is to provide light, durable couplings for the gear, composed of few parts, which may be readily and securely coupled together to form a neat, strong running gear. This object I attain by the means illustrated in the accompanying drawings, in connection with which the invention will be first fully described and then particularly referred to and pointed out in the claims.

Referring to the drawings, in which like parts are indicated by similar reference letters wherever they occur throughout the various views, Figure 1 is a perspective view of my gear irons coupled together with the axle, head block and reaches removed. Fig. 2 is a top or plan view of the same, with the bolster and portion of the spring coupling for the body and reaches in position. Fig. 3 is a longitudinal vertical section of the same taken through line $x$ $x$ of Fig. 2, with some of the parts shown in elevation. Fig. 4 is an inverted plan view of the upper fifth wheel member. Fig. 5 is a plan view of the lower fifth wheel member. Fig. 6 is an inverted plan view of the top perch iron, which has formed integral with it the head block skirt and king bolt socket.

Referring to the parts by reference letters, A, represents the front axle; A', the cap for the front axle; B, the head block or bolster; C, the central portion of an ordinary elliptic spring for coupling the bolster to the body, and D the reaches which couple the rear axle to the head block or front perch irons. These parts are of ordinary construction and need not therefore be specifically described.

The lower member of the fifth wheel device consists of two short segments, E, united by a bar, $e$, the bar being preferably rounded upon the upper side, having transverse depressions, $e'$, to seat the strap portion of the clips, $e^2$, which secure the lower member to the axle cap. Upon each side of the connecting bar, below the segmental members, are lugs, $e^3$, to pass upon each side of the bolster, and centrally between the segments is a downwardly projecting pin, $e^4$, to assist in steadying the lower fifth wheel member in place.

Centrally from the inside of the bar, $e$, projects a perforated lug or boss, $e^5$, through which the king bolt, F, passes. The upper side of the boss has a reduced neck to enter the counter sunk depression in a lug or boss, $g'$, which projects inwardly from the center of the transverse bar, $g$, of the upper fifth wheel member, G. The under side of the boss, $e^5$, is counter sunk to receive the upper end of a hard rubber sleeve, H, the opposite end of which is seated in a similar counter sunk depression in a lug, $i$, which projects inwardly from the center of the clip bar, I, which bar fits upon the under side of the axle, and at each end has laterally projecting perforated lugs, $i'$, to receive the screw threaded ends of the clips, $e^2$, which couple the lower fifth wheel member to the axle by means of the nuts upon the screw threaded ends of said clips.

The clip bar, I, for lightness, is coved out upon the upper side to fit the rounded lower portion of the axle, and rounded on the lower side to give a neat and finished appearance to the gear. The upper reach iron, D', has formed integral with it the head block skirt, $d$, which extends up from a perforated boss, $d'$, through which the king bolt, F, passes. The under side of the boss is recessed to receive and house the boss, $g'$, which projects inwardly from the bar, $g$, of the upper fifth wheel member.

The inner wall of the perforation for the king bolt is in a plane with the face of the skirt, $d$. The head of the king bolt is cut away upon one side to bear against the skirt, and the other portion is rounded and tapered at the top so that when the gear iron is put together the boss, king bolt and skirt appear to be in a single piece. The cut away portion of the kingbolt head prevents the kingbolt from turning when its tightening screw is fastened up.

The upper reach irons are recessed on their under sides to receive the reduced ends of the reaches, D, and have flat seats to receive the lower plates, D², of the reach irons. Both the ends of the lower reach irons and the recessed portion of the upper reach irons are perforated to receive bolts which pass through counter sunk bosses in the fifth wheel segment, G, and through the upper and lower reach irons to secure the parts together. The segment, G, has upwardly projecting lugs, $g^2$, in line with the transverse bar, $g$, to seat the bolster or head block, and has laterally projecting lugs, $g^3$, to receive the screw threaded ends of the clips, J, which couple the upper fifth wheel member, bolster and coupling spring together.

The gear is firmly braced by a front and rear bracket. Both brackets are perforated to pass the kingbolt, F. The inner bracket, K, extends up and has bifurcated arms, $k$, extending underneath the lower reach irons and coupled to the reaches by bolts passing through said arms, reaches and upper reach irons. The front bracket, L, extends forward at a right angle and then upward, and at its upper end is a skirt or web perforated to register with the perforations in the skirt iron of the upper reach irons. The parts are held together by bolts, $j$, which pass through both skirts and the head block.

It will be seen that the parts are easily fitted together and in putting them up the hard rubber tube, H, is made a little longer than the space between its seats, so that when the kingbolt nut is tightened up the tube will be compressed to its place, allowing the bars to be drawn tightly upon the axle cap and underneath the axle to compensate for any unevenness in [fit and preventing any rattling that would be liable to take place if a metal sleeve were used.

It is obvious that many mere mechanical changes may be made in the details of construction without varying the spirit or scope of the invention and hence, without limiting myself to the precise details of construction shown,

What I claim as new, and desire to secure by Letters Patent, is—

1. In a vehicle gear, the combination of the head block, the upper fifth wheel member, having formed integral with it a transverse bar and upwardly projecting lugs to furnish a seat for said head block, said bar having laterally projecting perforated lugs on both sides to receive the ends of the fastening clips and the inwardly projecting kingbolt socket, the top perch iron having formed integral with it the head block skirt and kingbolt socket, said socket being recessed upon the under side to seat the kingbolt socket which projects from the bar of the upper fifth wheel member, the spring coupling, the clips and nuts securing the spring, said fifth wheel member and the head block, the lower fifth wheel member consisting of segments, a bar uniting said segments to rest upon the axle cap, said bar having an inwardly projecting kingbolt socket, the axle and axle cap, the lower clip bar to fit the under side of the axle, said bar having laterally projecting perforated lugs to pass the threaded ends of securing clips and an inwardly projecting kingbolt socket, the clips and nuts for securing said bar and segments to the front axle, the reaches, the lower reach irons, the bracket having a kingbolt socket at one end and at the opposite end perforated arms to receive bolts for clamping the reaches between the reach irons, the front bracket having perforated kingbolt socket at its lower end, a perforated head block skirt plate at the upper end, the bolts for clamping the skirt plates upon opposite sides of the head block, the king bolt passing through these sockets and having tightening nut on one end to clamp the parts together, substantially as shown and described.

2. The combination with the front axle and head block of the upper and lower fifth wheel members having uniting bars to fit upon the adjacent edges of the axle cap and head block, and having kingbolt sockets projecting inwardly from the bars, the lower clip bar to fit the under side of the axle, having laterally projecting perforated lugs to receive the threaded ends of the clips and the inwardly projecting kingbolt socket, the spring coupling mounted on top of the head block, the clips and nuts for securing the fifth wheel members and spring coupling in place, the top perch iron having formed integral with it the head block skirt and kingbolt socket, the lower perch irons, the perches, the bracket, having arms bearing upon the under side of the perch iron and bolts for clamping the bracket, perch, and perch irons together, and having at its lower end kingbolt socket, the front bracket having kingbolt socket at its lower end extending up in front of the axle, a head block having formed integral with it the head block skirt iron, the king bolt, the elastic sleeve upon the kingbolt between the kingbolt sockets upon the lower clip bar and the fifth wheel member, and the nut on the lower end of the clip bar to couple the head block and its connections to the lower axle, substantially as shown and described.

3. The combination in a vehicle gear, substantially as specified, of the upper fifth wheel member, G, having formed integral with it bar, $g$, having laterally projecting lugs, $g^3$, and inwardly projecting kingbolt socket, the lower fifth wheel member, E, having the uniting bar of its segments or rub plates recessed on top to seat axle clips, and an inwardly projecting kingbolt socket, said socket recessed upon its upper side to receive the perforated boss of the upper fifth wheel member, the top perch iron, having head block skirt and kingbolt socket formed integral with it, the under side of said socket being recessed to receive the kingbolt socket of the upper fifth wheel member, the kingbolt passing through said sockets and having its head cut away upon one side to bear against the face of the head block skirt of the upper perch iron, and clips and clip bars to secure the fifth wheel members to the axle and head block respectively.

WILLIAM A. SAYERS.

Witnesses:
EMMA LYFORD,
GEO. J. MURRAY.